US010507712B2

(12) United States Patent
Nolta

(10) Patent No.: US 10,507,712 B2
(45) Date of Patent: Dec. 17, 2019

(54) HVAC DOOR WITH DENTIL FEATURES

(71) Applicant: Hanon Systems, Daejeon (KR)

(72) Inventor: James Nolta, Canton, MI (US)

(73) Assignee: HANON SYSTEMS, Daejeon (KR)

( * ) Notice: Subject to any disclaimer, the term of this patent is extended or adjusted under 35 U.S.C. 154(b) by 305 days.

(21) Appl. No.: 15/608,240

(22) Filed: May 30, 2017

(65) Prior Publication Data
US 2018/0345755 A1    Dec. 6, 2018

(51) Int. Cl.
*B60H 1/34* (2006.01)
*B60J 5/04* (2006.01)
*B60H 1/00* (2006.01)

(52) U.S. Cl.
CPC ........ *B60J 5/0493* (2013.01); *B60H 1/00678* (2013.01); *B60H 2001/00714* (2013.01); *B60H 2001/00721* (2013.01)

(58) Field of Classification Search
CPC ............ B60H 1/00864; B60H 1/00835; B60H 1/00028; B60H 1/00435; B60H 2001/00721; B60H 2001/00714; B60J 5/0493
USPC .......................................... 454/107–109, 155
See application file for complete search history.

(56) References Cited

U.S. PATENT DOCUMENTS

| 5,476,418 | A  | * | 12/1995 | Loup ................. B60H 1/00678 454/121 |
| 7,878,235 | B2 |   | 2/2011  | Park et al. |
| 8,757,245 | B2 |   | 6/2014  | Richter et al. |
| 8,840,452 | B2 |   | 9/2014  | Han |
| 2015/0360536 | A1 | * | 12/2015 | Terai ................. B60H 1/00678 454/333 |

FOREIGN PATENT DOCUMENTS

JP          2017030656 A       2/2017

* cited by examiner

*Primary Examiner* — Steven B McAllister
*Assistant Examiner* — Ko-Wei Lin
(74) *Attorney, Agent, or Firm* — Shumaker, Loop & Kendrick, LLP; James D. Miller

(57) ABSTRACT

An air handling system for a heating, ventilating, and air conditioning system comprises a housing including a sealing surface, a door wall disposed in the housing having a perimeter, and a sealing element disposed about the perimeter of the door wall. The sealing element includes a base, a stem, and a tip. The base is coupled to the perimeter of the door wall, the stem is formed between the base and the tip, and the tip is configured to selectively engage the sealing surface of the housing. A plurality of dentil features project from the stem of the sealing element and is arranged in a linear array extending parallel to the perimeter of the door wall. The array of the dentil features is configured to reduce an incidence of whistling when a flow of air passes by the tip of the sealing element.

20 Claims, 7 Drawing Sheets

FIG. 1 - PRIOR ART

# HVAC DOOR WITH DENTIL FEATURES

FIELD OF THE INVENTION

The invention relates to a heating, ventilating, and air conditioning system for a vehicle, and more particularly to a fluid distribution door configured to reduce an incidence of noise caused by air rushing past a surface of the fluid distribution door.

BACKGROUND OF THE INVENTION

A vehicle typically includes a climate control system which maintains a temperature within a passenger compartment of the vehicle at a comfortable level by providing heating, cooling, and ventilation. Comfort may be maintained in the passenger compartment by an integrated system referred to as a heating, ventilating and air conditioning (HVAC) air-handling system. The HVAC air-handling system conditions air flowing therethrough and distributes the conditioned air throughout the passenger compartment. The design of an HVAC air-handling system includes features that control air flow volume, air temperature, and air flow pathways, for example. Performance of the HVAC air-handling system may comply with particular targets including temperature stratification and air-flow distribution between various outlet vents of the HVAC air-handling system disposed within the passenger compartment.

Many of the HVAC air-handling systems utilize a rotatable fluid distribution door for controlling the flow of air through the air-handling systems. The fluid distribution door is typically rotatable between a plurality of positions associated with a plurality of air flow patterns through the air-handling system, wherein each of the air flow patterns corresponds to a desired flow rate and temperature of the air through the vents of the air-handling system. In many circumstances, the fluid distribution door is rotated to a position wherein edges of the fluid distribution door abut sealing surfaces of a housing in which the fluid distribution door is rotatably disposed to prevent the passage of the air beyond the door. In other circumstances, the fluid distribution door may be rotated to a position allowing for a small flow of air, also referred to as a "bleed," to pass beyond one of more edges of the door to maintain a minimum flow of air through at least one of the vents in accordance with the requirements of the passenger of the motor vehicle.

A representative example of a fluid distribution door 100 of the prior art while in the bleed position is illustrated in FIG. 1. The fluid distribution door includes an axis of rotation and at least one door wall 101 extending therefrom. A flexible sealing element 110 is disposed about a perimeter of each of the door walls 101 for engaging surfaces of the housing of the HVAC air-handling system to close off the flow of the air through at least a portion of the HVAC air-handling system. The sealing element 110 generally includes a cross-sectional shape including a base 112 formed at first end adjacent the outer edge of the door surface 101, a bead 114 formed at a distal end of the sealing element 110 forming an outer peripheral surface thereof, and a stem 116 extending between the base 112 and the bead 114. The base 112 forms a connection point for coupling the sealing element 110 to the perimeter of each of the door surfaces 101. The stem 116 generally includes a thickness less than that of the base 112 and the bead 114, respectively. The smaller thickness stem 116 is configured to flex to facilitate forming a suitable seal between the bead 114 of the sealing element 110 and the surface of the housing throughout a plurality of rotational positions of the fluid distribution door 100. The bead 114 is formed to have a larger thickness than the stem 116 to cause air flowing past the bead 114 to experience a small degree of localized turbulence. The localized turbulence is intended to prevent the occurrence of whistling as the air flows past the sealing element 110, especially when the fluid distribution door 100 is positioned in the "bleed" position wherein the bead 114 is disposed immediately adjacent the sealing surface of the housing. However, the exclusive use of the bead 114 formed at the end of the sealing element 110 may not be effective at preventing the incidence of noise, such as whistling, when the flow of the air passes by the door surface 101 under certain circumstances and operating conditions.

One solution to the incidence of unwanted whistling is to further add a secondary noise reducing feature to the portion of the housing forming the sealing surface thereof to further interrupt the flow of the air past the edge of the door surface having the sealing element to produce localized turbulence as described above. Alternatively, another solution includes modifying the outermost edges of the door surface or the sealing element to include various irregularities such as indentations and protrusions to cause a plurality of variable gaps to be present between the fluid distribution door and the sealing surface of the housing even when the fluid distribution is rotated to a position intended to close off the flow of the air past the door surface. The variable gaps similarly promote localized turbulence as the flow of the air passes by the door surface. In either case, such features present at the interface between the fluid distribution door and the housing may introduce an incidence of continuous unwanted air flow past the door surface due to the presence of the variable gaps forming a continuously open flow path. Such secondary features therefore undesirably alter the flow patterns of the air through the HVAC air-handling system when attempting to minimize the incidence of whistling when air flows past each of the door surfaces.

Another solution includes the application of a foam element adjacent the area of engagement of the door surface or sealing element to the sealing surface of the housing for interrupting the flow of the air past the door surface. However, it has been found that the use of such foam elements presents an issue of quality control due to the application of the foam element being inconsistent and operator dependent.

It would therefore be desirable to produce a fluid distribution door that minimizes the incidence of whistling when air is caused to flow past the fluid distribution door while also preventing an unwanted flow of the air past the fluid distribution door when in a closed position intended to block the flow of the air past the fluid distribution door.

SUMMARY OF THE INVENTION

Concordant and consistent with the present invention, an improved fluid sitribution door having a sealing element configured to reduce an incidence of whistling when air flows past the sealing element has surprisingly been discovered.

In one embodiment, a fluid distribution door for use in an air handling system for a heating, ventilating, and air conditioning system comprises a door wall having a perimeter and a sealing element disposed about the perimeter of the door wall. The sealing element including a base, a stem, and a tip. The base is coupled to the perimeter of the door wall and the stem is formed between the base and the tip. A plurality of dentil features projects from the stem of the sealing element.

In another embodiment, an air handling system for a heating, ventilating, and air conditioning system comprises a housing including a sealing surface, a door wall disposed in the housing having a perimeter, and a sealing element disposed about the perimeter of the door wall. The sealing element including a base, a stem, and a tip. The base is coupled to the perimeter of the door wall, the stem is formed between the base and the tip, and the tip is configured to selectively engage the sealing surface of the housing. A plurality of dentil features projects from the stem of the sealing element and is arranged in a linear array extending parallel to the perimeter of the door wall. The array of the dentil features is configured to reduce an incidence of whistling when a flow of air passes by the tip of the sealing element.

BRIEF DESCRIPTION OF THE DRAWINGS

The above, as well as other advantages of the present invention will become readily apparent to those skilled in the art from the following detailed description, particularly when considered in the light of the drawings described herein.

DETAILED DESCRIPTION

Figure 1:
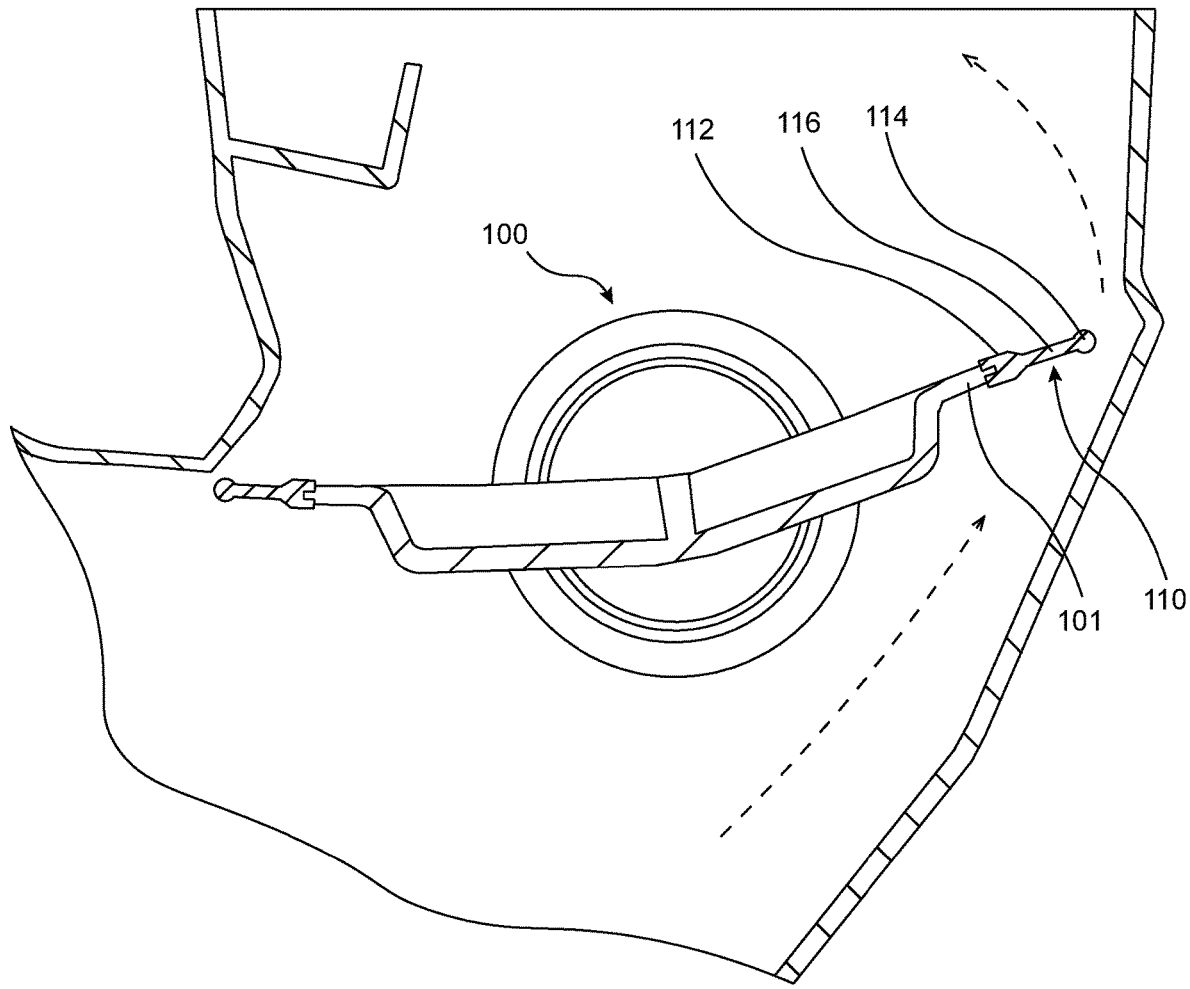
FIG. 1 is a cross-sectional elevational view of an air handling system having a fluid distribution door according to the prior art.

The following detailed description and appended drawings describe and illustrate various embodiments of the invention. The description and drawings serve to enable one skilled in the art to make and use the invention, and are not intended to limit the scope of the invention in any manner.

FIGS. 2-10 illustrate a fluid distribution door 20 for use in an air-handling system of a heating, ventilating, and air conditioning (HVAC) system or climate control system (not shown) for a vehicle (not shown) according to an embodiment of the invention. As used herein, the term air can refer to a fluid in a gaseous state, a fluid in a liquid state, or a combination thereof. The air-handling system is also commonly referred to as an HVAC air-handling system. It is understood that the fluid distribution door 20 may be used with other types of air-handling systems as desired, such as an auxiliary or rear air-handling system, a lateral or "handed" air-handling system, and a center mount and a semi-center mount air-handling system, for example. The air-handling system typically provides heating, ventilation, and air conditioning for a passenger compartment (not shown) of the vehicle. The air-handling system is adapted to be installed between vehicle sheet metal (not shown) and an interior trim panel (not shown). It is understood that the air-handling system can be installed in other locations in the vehicle as desired, such as under an instrument panel, to a dash panel, in a trunk, in a console, under a floor, in a headliner, or in an engine compartment, for example.

The air-handling system may include a first housing and a cooperating second housing interfacing along a common plane to form a hollow main housing 14 for conveying a flow of air therethrough. The main housing 14 may include an inlet section (not shown), a conditioning section (not shown), a mixing section 8, and a delivery section 9. The supply of air can be provided from outside of the vehicle, recirculated from the passenger compartment of the vehicle, or a mixture of the two, for example. The conditioning section may include heat exchangers such as an evaporator core (not shown) and a heater core (not shown) for controlling a temperature and a humidity of the supply of the air to be distributed to the vents of the motor vehicle. The air exiting the conditioning section flows into the mixing section 8 where the air is mixed before being distributed to the vents of the motor vehicle via the delivery section 9. The delivery section 9 may include a plurality of fluid conduits leading to various different vents of the passenger compartment of the motor vehicle. For example, a first fluid conduit may lead to one or more windshield defrost vents (not shown) and one or more side window defrost vents (not shown), a second conduit may lead to one or more panel vents (not shown) and one or more console vents (not shown), and a third conduit may lead to one or more front floor vents (not shown) and one or more rear floor vents (not shown). However, it should be understood that various other configurations of the fluid conduits leading to various different vents of the air handling system may be used without departing from the scope of the present invention. The associated air handling system may similarly include any configuration of the heat exchangers, flow passageways, or fluid control features without departing from the scope of the present invention. The conditioning section of the air handling system may for example be similar to that described in any of U.S. Pat. No. 7,878,235 to Park et al., U.S. Pat. No. 8,757,245 to Richter et al., and U.S. Pat. No. 8,840,452 to Han, as non-limiting examples, which are hereby incorporated herein by reference in their entirety.

Figure 8:
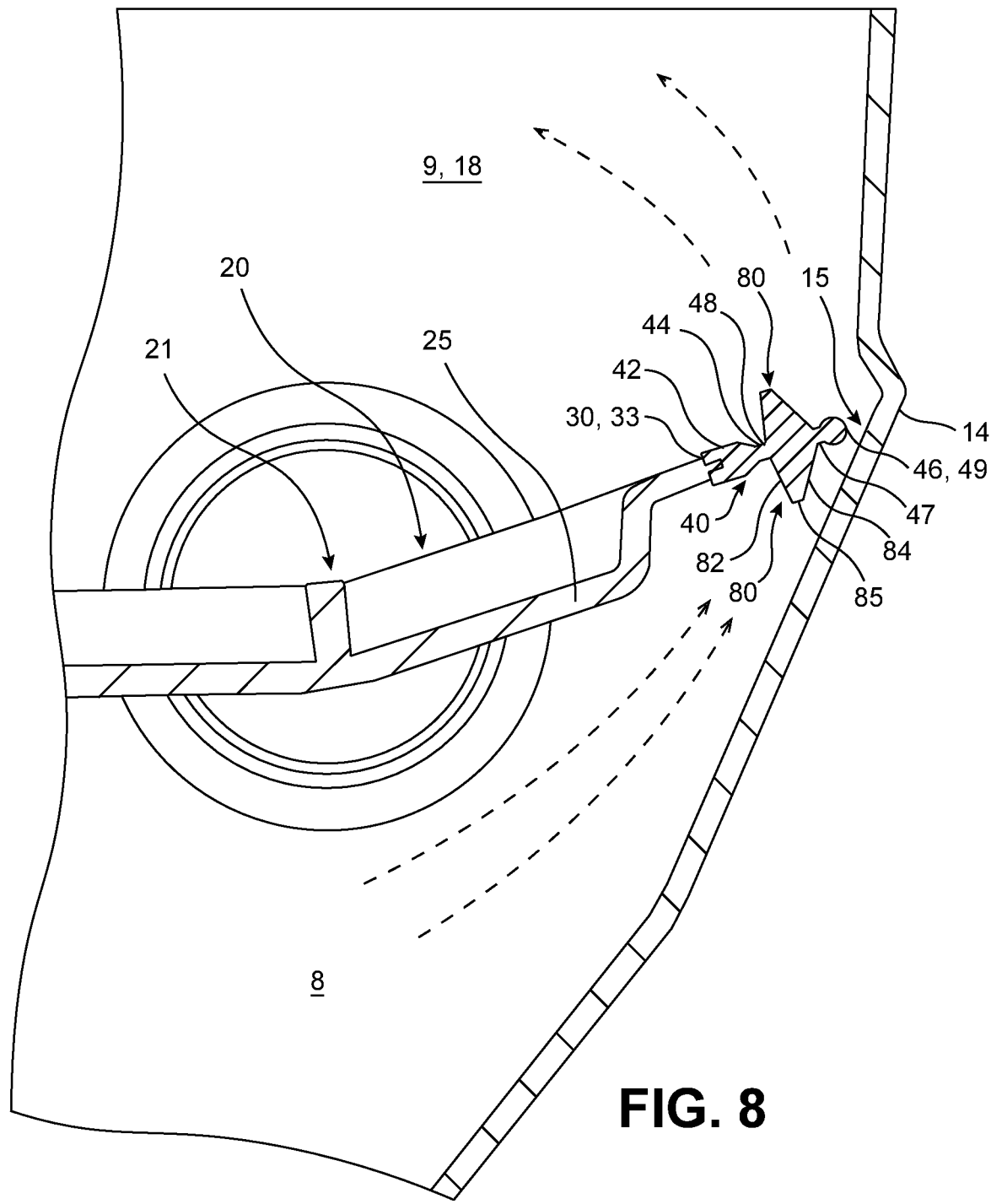
FIG. 8 is an enlarged fragmentary cross-sectional elevational view of the fluid distribution door when positioned in a first bleed position within a housing.
Figure 9:
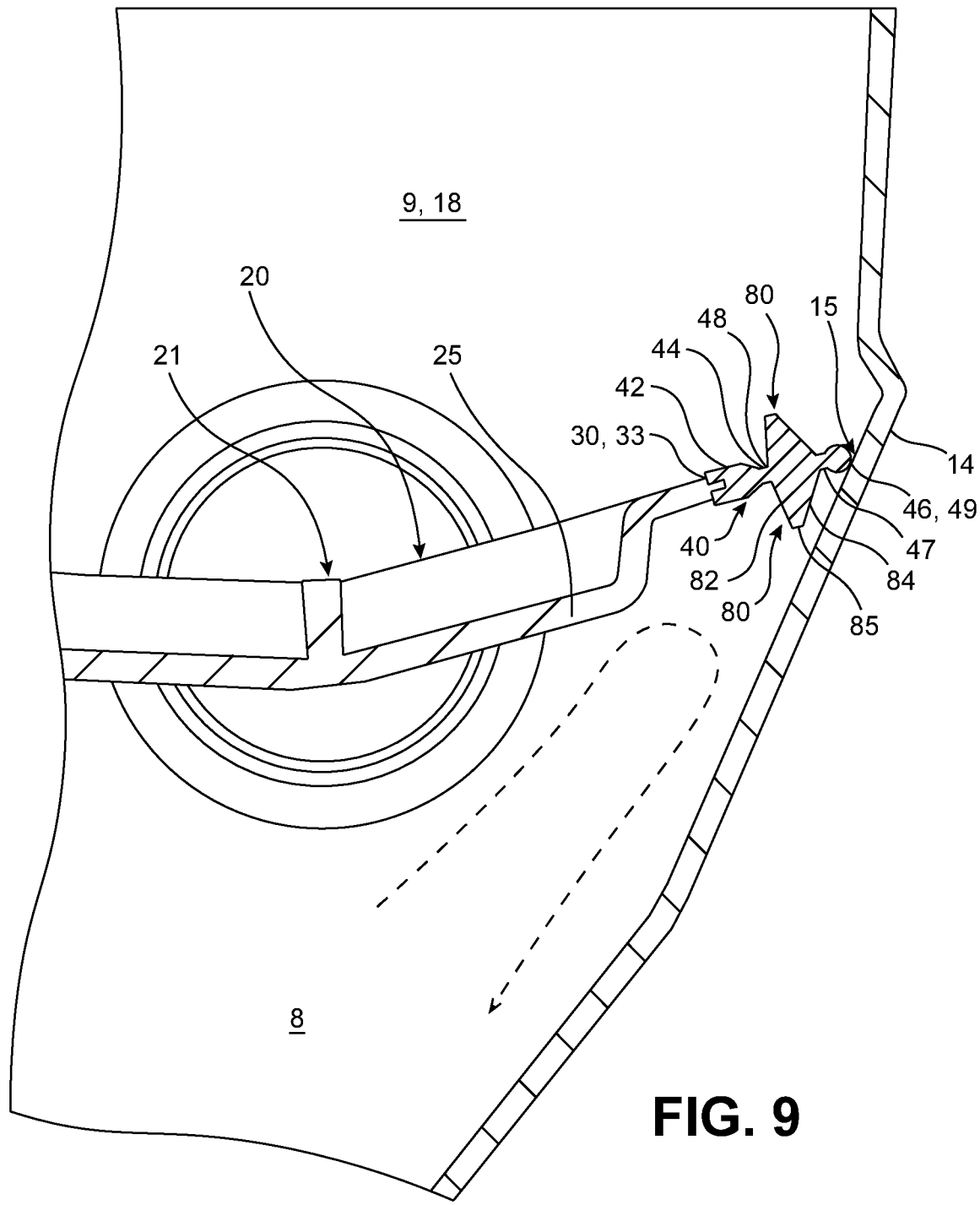
FIG. 9 is an enlarged fragmentary cross-sectional elevational view of the fluid distribution door when positioned in a closed position within the housing.
Figure 10:
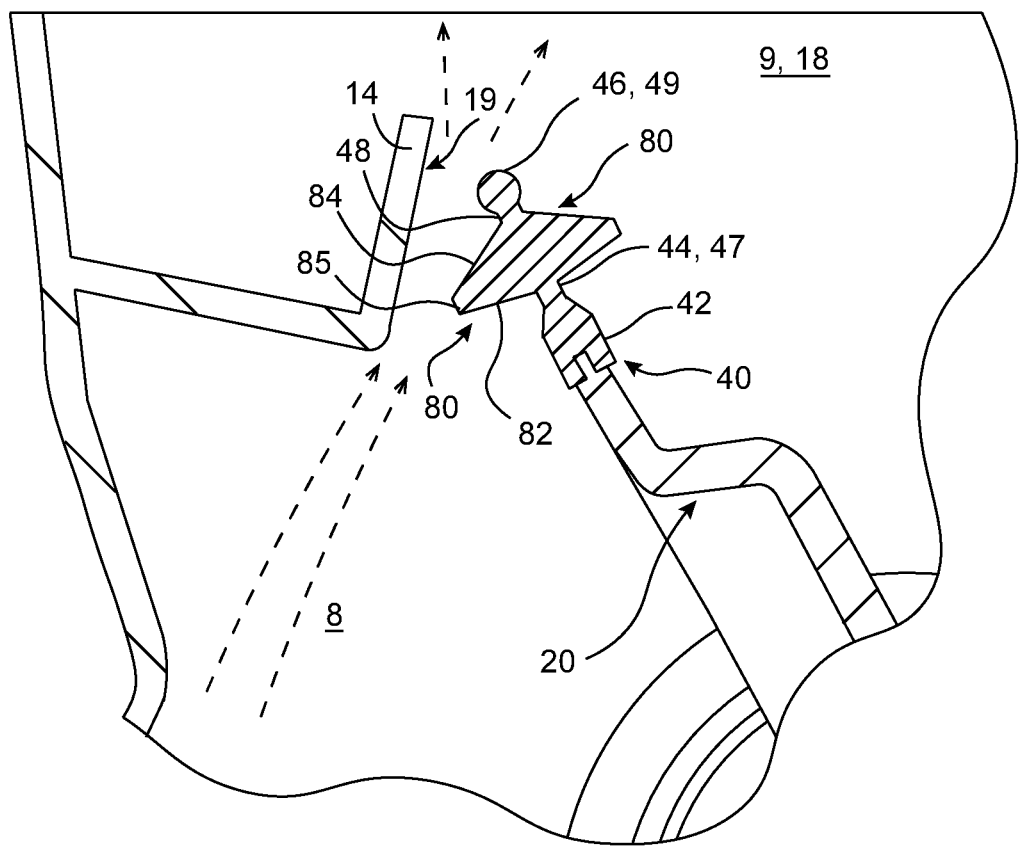
FIG. 10 is an enlarged fragmentary cross-sectional elevational view of the fluid distribution door when positioned in a second bleed position within the housing.

FIGS. 8-10 illustrate a representative fluid conduit 18 of the delivery section 9 disposed immediately downstream of the mixing section 8. The fluid distribution door 20 is disposed intermediate the mixing section 8 and the fluid conduit 18 of the delivery section 9. The fluid conduit 18 shown in FIGS. 8-10 may be adapted for distributing the air to one of the vents of the motor vehicle, but it should be understood by one skilled in the art that the advantageous features of the fluid distribution door 20 may be adapted for use in any portion of the air handling system having a flow of air passing thereby, and especially any portion of the air handling system that is placed in a bleed position wherein a small flow area for the flow of air is provided between the fluid distribution door 20 and a sealing surface of the main housing 14 formed adjacent the fluid distribution door 20. The fluid distribution door 20 may alternatively be disposed within the conditioning section of the air handling system for controlling the flow of the air through or around the heat exchangers thereof for controlling a temperature of the air entering the mixing section 8, as one non-limiting example.

Figure 2:
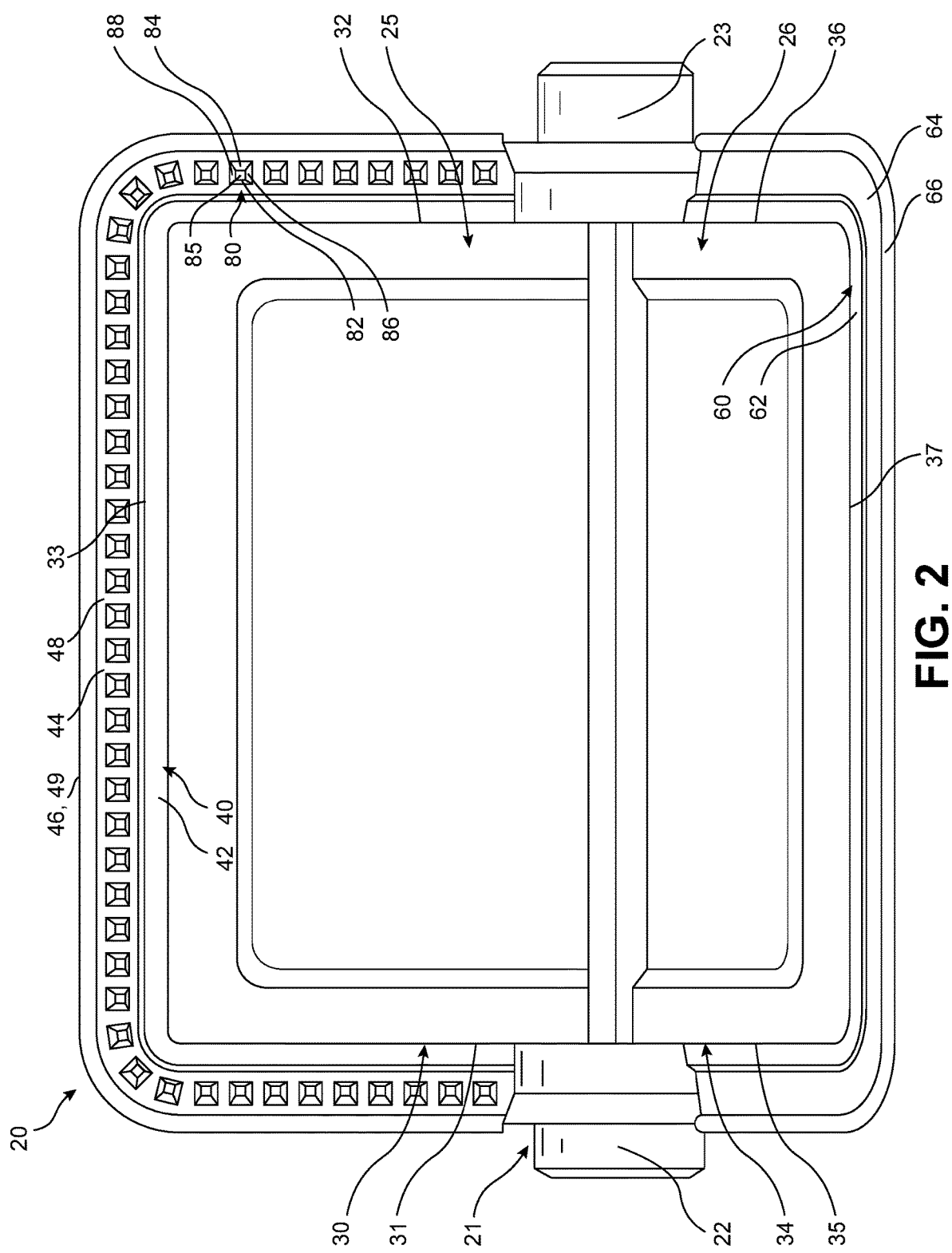
FIG. 2 is a front elevational view of a fluid distribution door according to an embodiment of the invention.

The fluid distribution door 20 is rotatable to a plurality of positions associated with a plurality of different flow configurations of the flow of air through the delivery section. As shown in FIG. 2, the fluid distribution door 20 includes a shaft 21 forming an axis of rotation of the fluid distribution door 20. The shaft 21 is shown as including a first shaft portion 22 disposed at a first end of the fluid distribution door 20 and a second shaft portion 23 disposed at a second end of the fluid distribution door 20. However, in other embodiments, the shaft 21 may be formed by a single structure extending from the first end to the second end of the fluid distribution door 20. The first shaft portion 22 may be rotatably coupled to the first housing and the second shaft portion 23 may be rotatably coupled to the second housing, as desired. The shaft 21 is connected to an actuator mechanism (not shown) such as an electrical positioning motor, for example, for controlling a pivotal position of the fluid distribution door 20. It is understood that the actuator mechanism can be electrically operated, mechanically operated, or fluidly operated, for example. It is also understood that the fluid distribution door 20 can be directly connected to the actuator mechanism.

The fluid distribution door 20 is shown in FIG. 2 as having a dual panel construction including a first door wall 25 extending radially outwardly from the shaft 21 oriented at an obtuse angle with respect to a second door wall 26 also extending radially outwardly from the shaft 21. However, a single panel construction of the fluid distribution door having a substantially rectangular shape may be used without departing from the scope of the present invention. The first door wall 25 has a first perimeter 30 defined by a first radial edge 31, an oppositely arranged second radial edge 32, and a first distal edge 33 connecting the first radial edge 31 to the second radial edge 32. The second door wall 26 has a second perimeter 34 defined by a third radial edge 35, an oppositely arranged fourth radial edge 36, and a second distal edge 37 connecting the third radial edge 35 to the fourth radial edge 36. The first distal edge 33 forms a distal surface of the first door wall 25 formed to one side of the axis of rotation of the fluid distribution door 20 while the second distal edge 37 forms a distal surface of the second door wall 26 formed to a second side of the axis of rotation of the fluid distribution door 20. The first distal edge 33 and the second distal edge 37 may each extend substantially parallel to the axis of rotation of the fluid distribution door 20.

The fluid distribution door 20 is shown and described as being substantially rectangular in shape, but the fluid distribution door 20 may have any shape suitable for properly engaging the corresponding surfaces of the main housing 14 to form a seal therebetween. For example, the distal edges 33, 37 of the fluid distribution door 20 engaging the main housing 14 may have an irregular or curvilinear shape, such as an arcuate shape, suitable for engaging the corresponding sealing surfaces of the main housing 14. Additional shapes may also be used without departing from the scope of the present invention. Furthermore, the first distal edge 33 and the second distal edge 37 may be spaced different distances from the axis of rotation of the fluid distribution door 20 depending on a configuration of the air handling system. However, any suitable configuration may be used without departing from the scope of the present invention, so long as the fluid distribution door 20 is dimensioned to engage the corresponding surfaces of the main housing 14 in accordance with the desired operation of the fluid distribution door 20.

A first sealing element 40 is disposed about the first perimeter 30 of the first door wall 25 and a second sealing element 60 is disposed about the second perimeter 34 of the second door wall 26. In the embodiment shown, the sealing elements 40, 60 are formed from a thermoplastic such as a thermoplastic vulcanizate, for example. It is understood that the sealing elements 40, 60 can be formed from other materials as desired. As a non-limiting example, the sealing elements 40, 60 may be attached to the respective perimeters 30, 34 of the door walls 25, 26 via injection molding where the seal material is made of a resilient compound, such as TPV, TEO, TPE, or variations thereof. Alternatively, the sealing elements 40, 60 may be coupled to the perimeters 30, 34 using any known method within the art without departing from the scope of the present invention.

The first sealing element 40 includes a base 42, a stem 44, and a tip 46. The base 40 forms a portion of the first sealing element 40 coupled directly to the first perimeter 30 of the first door wall 25. Referring to FIGS. 8-10, which show the first sealing element 40 in cross-section, the base 40 may include an enlarged thickness in comparison to a thickness of the stem 44. The thickness of the stem 44 may be selected to impart a desired degree of flexibility to allow the stem 44 to flex and bend in reaction to the first sealing element 40 engaging a sealing surface 15 of the main housing 14. The stem 44 extends away from the base 42 in a direction substantially parallel to a direction of extension of the first door wall 25 to space the tip 46 of the first sealing element 40 from the base 42 thereof. The stem 44 includes a first surface 47 and an oppositely arranged second surface 48. The tip 46 of the first sealing element 40 is disposed at a distal end of the stem 44 opposite the base 42 thereof. The tip 46 is shown in FIGS. 8-10 as having an enlarged thickness in comparison to the stem 44 to form a bead 49 at the distal end of the stem 44 having a substantially circular or elliptical cross-sectional shape. The tip 46 of the first sealing element 40 is configured to engage the sealing surface 15 of the main housing 14 when the fluid distribution door 20 is rotated to a position intended to block the flow of air past the first perimeter 30 of the first door wall 25.

The first sealing element 40 further includes a plurality of dentil features 80 formed thereon. Each of the dentil features 80 is a projection extending from the stem 44 of the first sealing element 40 intermediate the base 42 and the tip 46 thereof. The dentil features 80 are oriented to project away from a corresponding one of the opposing surfaces 47, 48 of the stem 44 in a direction transverse thereto. The dentil features 80 may be formed on one or both of the opposing surfaces 47, 48 of the stem 44 in accordance with the desired flow configurations past the fluid distribution door 20, as explained in greater detail hereinafter when describing a method of use of the fluid distribution door 20. The fluid distribution door 20 shown in FIGS. 8-10 includes a plurality of the dentil features 80 disposed on each of the first surface 47 of the stem 44 and the opposing second surface 48 of the stem 44.

As shown in FIG. 2, each of the dentil features 80 is spaced from an adjacent one of the dentil features 80 on the second surface 48 of the stem 44 in a direction parallel to each of the first perimeter 30 and a perimeter of the tip 46 of the first sealing element 40. As such, the dentil features 80 are arranged in a single-rowed linearly extending array having a shape substantially corresponding to a shape of the first perimeter 30 of the first door wall 25. In some embodiments, the array of the dentil features 80 extends along an entirety of the first sealing element 40 as it extends around the first perimeter 30 and in other embodiments the array of the dentil features 80 extends along only a portion of the first perimeter 30. As should be understood, the array of the dentil features 80 may include any curvilinear or polygonal shape in accordance with the shape of the corresponding at least a portion of the first perimeter 30. As shown in FIG. 2, the array of the dentil features 80 includes rectilinear portions extending along each of the first radial edge 31, the second radial edge 32, and the first distal edge 33 of the first door wall 25 with rounded portions interposed therebetween. The arrangement of the array of the dentil features 80 is shown exclusively with reference to the second surface 48 of the stem 44 in FIG. 2, but it should be understood that the dentil features 80 may also be arranged in an array on the first surface 47 of the stem 44 in the same manner as shown and described with reference to the second surface 48, as desired. For example, the size, shape, and spacing present between adjacent ones of the dentil features 80 formed on the first surface 47 of the stem 44 may be substantially similar in size, shape, and spacing of the dentil features 80 formed on the second surface 48. The first surface 47 may alternatively include differing spacings and configurations of the dentil features 80, as desired.

Each of the dentil features 80 includes an inboard face 82 in facing relationship with the base 42 of the first sealing element 40, an outboard face 84 in facing relationship with the tip 46 of the first sealing element 40, a first side face 86, and an opposing second side face 88. The faces 82, 84, 86, 88 cooperate to cause each of the dentil features 80 to be substantially pyramidal in shape. The outboard face 84 of each of the dentil features 80 is spaced from the bead 49 of the first sealing element 40 and the inboard face 82 of each of the dentil features 80 is spaced from the base 42 of the first sealing element 40. As such, at least a portion of the stem 44 is always present between each of the dentil features 80 and each of the base 42 and the tip 46 of the first sealing element 40, and more specifically the bead 49 of the first sealing element 40. A spacing present between the first side face 86 of one of the dentil features 80 and the second side face 88 of an adjacent one of the dentil features 80 may be substantially equal or may be varied as the array of the dentil features 80 extends about the first perimeter 30, as desired.

Figure 3:
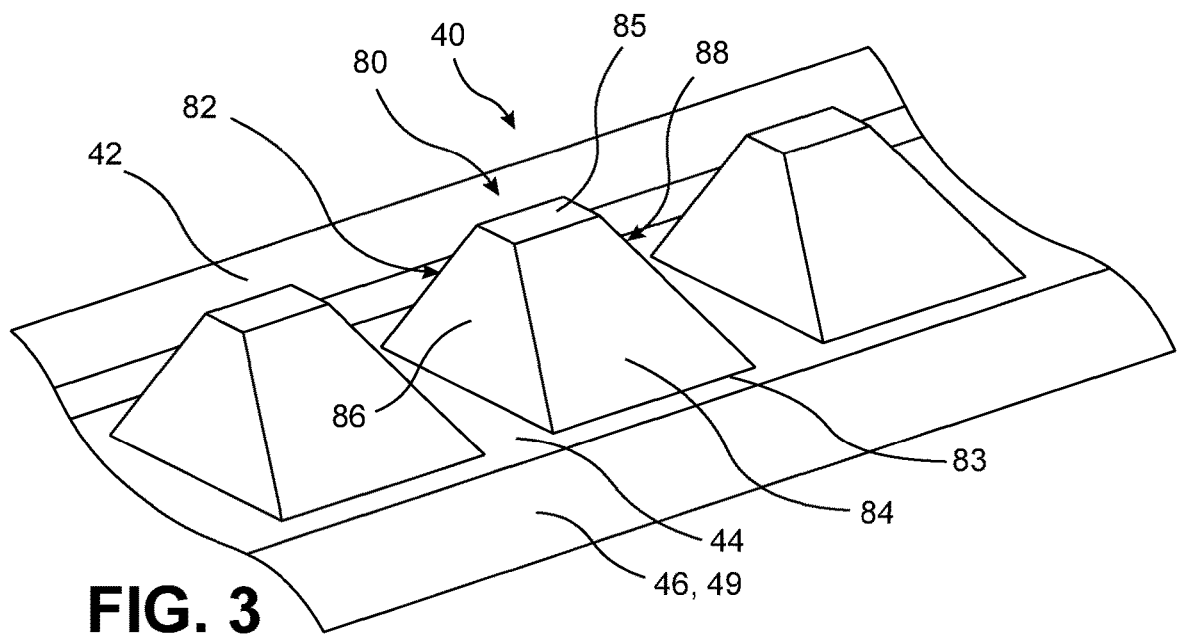
FIG. 3 is an enlarged fragmentary perspective view of an array of dentil features formed on the fluid distribution door of FIG. 2, wherein each of the dentil features has a truncated pyramidal shape.

Each of the dentil features 80 is shown in FIGS. 2 and 3 as having the shape of a truncated rectangular pyramid including a rectangular base 83 formed co-planar with the corresponding surface 47, 48 of the stem 44 from which each of the dentil features 80 projects and an outermost face 85 formed by truncation of the pyramid arranged substantially parallel to the base 83 thereof. Each of the dentil features 80 may form a right pyramid having the outermost face 85 thereof centered over the base 83 thereof or each of the dentil features 80 may form an oblique pyramid wherein one of the inboard face 82 or the outboard face 84 is inclined with respect to the corresponding surface 47, 48 of the stem 44 at an angle differing from that of the other of the inboard face 82 or the outboard face 84. The inboard face 82 may be angled at an acute angle or an obtuse angle with respect to the corresponding surface 47, 48 of the stem 44 and the outboard face 84 may similarly be angled at an acute angle or an obtuse angle with respect to the corresponding surface 47, 48 of the stem 44. In the embodiment shown in FIGS. 2 and 8-10, an obtuse angle formed between the outboard face 84 of each of the dentil features 80 and the corresponding surface 47, 48 of the stem 44 is greater than an obtuse angle formed between the inboard face 82 of each dentil features 80 and the corresponding surface 47, 48 of the stem 44.

Figure 4:
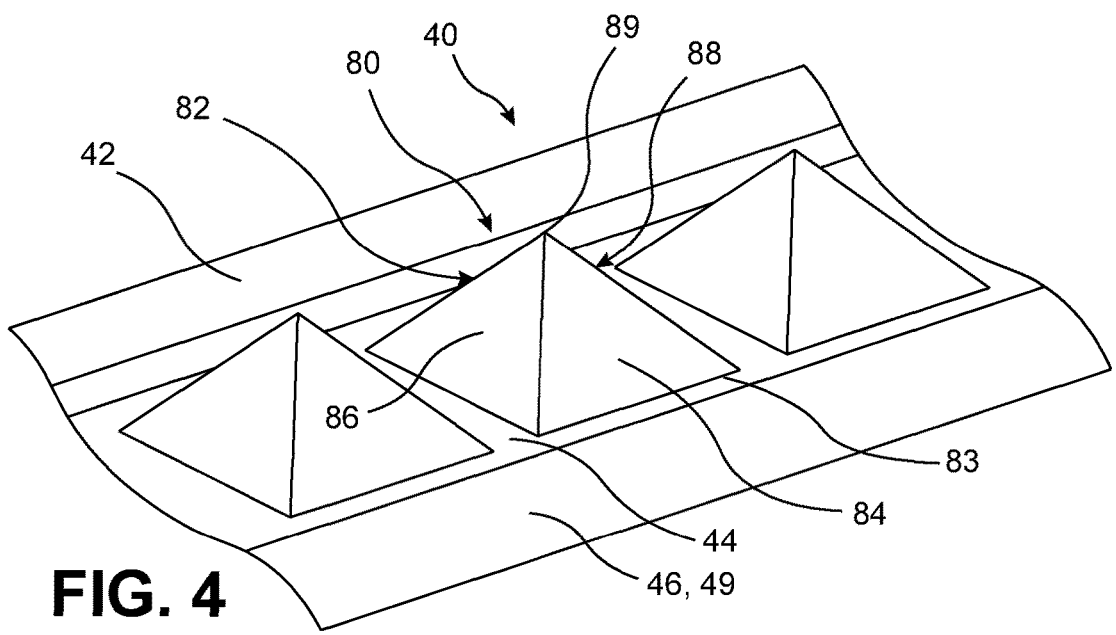
FIG. 4 is an enlarged fragmentary perspective view of an array of dentil features, wherein each of the dentil features has a pyramidal shape including an apex.

The dentil features 80 are not limited to the configuration shown in FIGS. 2 and 3. As shown in FIG. 4, each of the dentil features 80 may be in the form of a rectangular pyramid having an apex 89 formed at an intersection of each of the faces 82, 84, 86, 88 in place of the outermost face 85 of each of the truncated pyramids of FIGS. 2 and 3. The non-truncated pyramid shape may be formed as a right pyramid having the apex 89 centered over the base 83 or as an oblique pyramid having the apex 89 offset from the center of the base 83, resulting in an angle of inclination of the inboard face 82 relative to the stem 44 different from an angle of inclination of the outboard face 84 relative to the stem 44.

Figure 5:
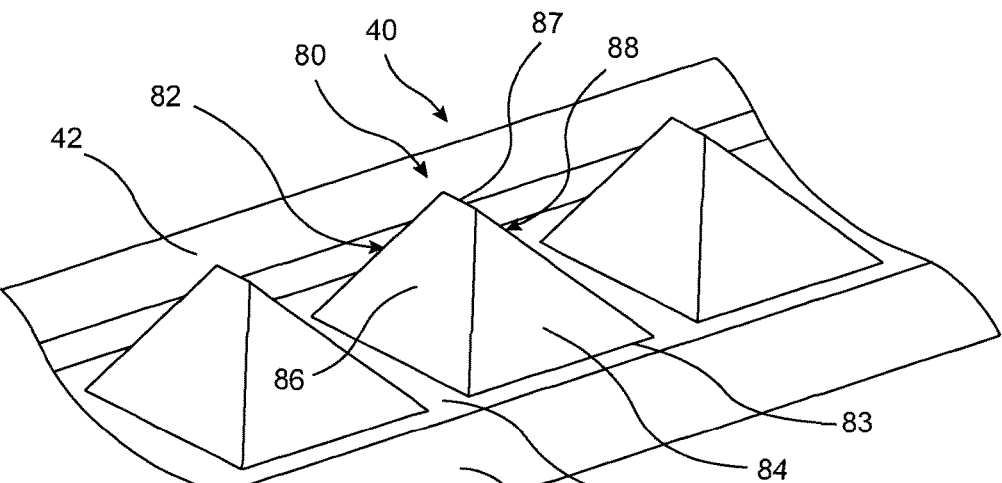
FIG. 5 is an enlarged fragmentary perspective view of an array of dentil features, wherein each of the dentil features has a pyramidal shape including an edge formed by the cooperation of two opposing faces of each of the dentil features.

As shown in FIG. 5, each of the dentil features 80 may alternatively be formed to include a rectangular base 83 and an elongated edge 87 formed at an intersection of one of the first side face 86 and the second side face 88 or the inboard face 82 and the outboard face 84. The embodiment shown in FIG. 5 includes the edge 87 formed between the first side face 86 and the second side face 88 to cause the edge 87 to be arranged substantially normal to the first perimeter 30 and the tip 46 of the first sealing element 40.

Figure 6:
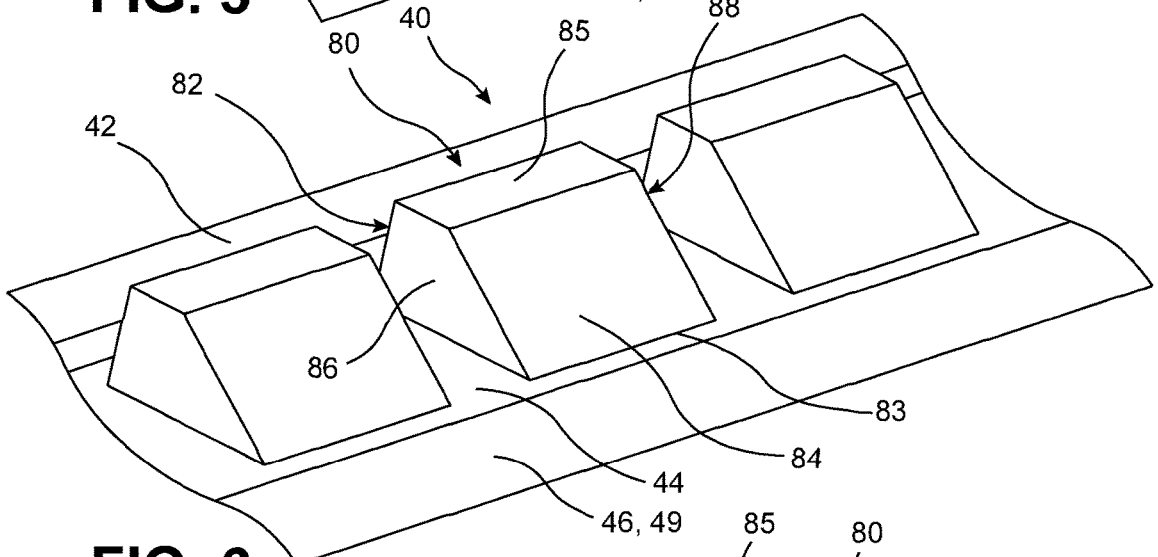
FIG. 6 is an enlarged fragmentary perspective view of an array of dentil features, wherein each of the dentil features includes two parallel extending faces.
Figure 7:
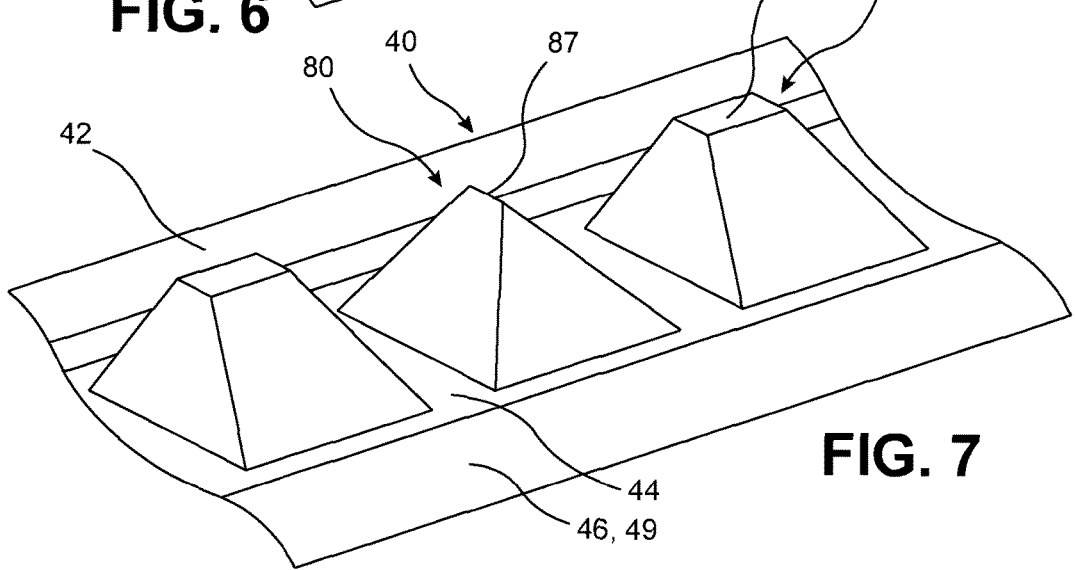
FIG. 7 is an enlarged fragmentary perspective view of an array of dentil features having alternating structural configurations.

Finally, as shown in FIG. 6, each of the dentil features 80 may alternatively be formed wherein the first side face 86 and the second side face 84 are arranged substantially parallel to each other and normal relative to the corresponding surface 47, 48 of the stem 44 from which each of the dentil features 80 projects. The inboard face 82 and the outboard face 84 may be sloped to intersect along a common edge or each of the dentil features 80 may be truncated to produce the outermost face 85 thereof, as desired.

It should further be understood that each of the arrays of the dentil features 80 may include an alternating pattern of two or more of the configurations shown and described hereinabove with reference to any of FIGS. 2-6. For example, with reference to FIG. 7, an alternating pattern of truncated oblique pyramids having an outermost face 85 and pyramidal shapes including an edge 87 formed between the side faces 86, 88 thereof may be used, as desired, as one non-limiting example.

The dentil features 80 may be formed to have any suitable configuration as shown and described suitable for reducing the incidence of whistling when air flows past the array of the dentil features 80. The various faces 82, 84, 85, 86, 88 of each of the dentil features 80 may be selected to have a specific size, shape, angle of inclination relative to the stem 44, and spacing formed therebetween to account for any number of differing flow configurations or main housing 14 configurations formed relative to the fluid distribution door 20.

Referring again to FIG. 2, the second sealing element 60 includes a base 62, a stem 64, and a tip 66 formed by a bead 69 in similar fashion to the first sealing element 40. However, the second sealing element 60 is shown as devoid of the plurality of the dentil features 80 arranged in one or more arrays. The selection of which surfaces of the fluid distribution door 20 require the inclusion of the array of the dentil features 80 may be dependent on the method of use of the fluid distribution door 20 and the different operating modes thereof, as desired. It should be understood that some configurations of the fluid distribution door 20 may require an array of the dentil features 80 disposed about an entirety of a perimeter of each of the door walls forming the fluid distribution door 20, as desired, whereas other configurations may not necessitate the inclusion of such features on each portion of the perimeter of the fluid distribution door 20 due to the flow characteristics of the flow of air as it passes by these specific surfaces.

With reference now to FIGS. 8-10, a method of use of the fluid distribution door 20 is described. As explained previously, the fluid distribution door 20 may be rotatable to a plurality of different positions resulting in different flow configurations past at least one of the first perimeter 30 or the second perimeter 34 of the fluid distribution door 20. In other circumstances, the fluid distribution door 20 may be rotated to a position wherein flow is intended to be entirely blocked from flowing past at least one of the first perimeter 30 or the second perimeter 34 to prevent the flow of the air from reaching specified portions of the HVAC air-handling system such as the vents within the passenger compartment of the motor vehicle. Although the sealing surface 15 of the housing 14 is shown as engaging only those portions of the first sealing element 40 disposed on the distal edge 33 of the first perimeter 30, it is understood that the sealing surface 15 may be formed by any configuration of surfaces of the main housing 14 suitable for engaging and forming a seal with the first sealing element 40 and/or the second sealing element 60. For example, the sealing surface 15 may have a perimeter shape substantially corresponding to that of the first perimeter 30 and the second perimeter 34 of the fluid distribution door 20, as desired.

The fluid distribution door 20 is illustrated in FIG. 8 as being in a bleed position wherein a relatively small gap is formed between the tip 46 or bead 49 of the first sealing element 40 and the sealing surface 15 of the main housing 14. The relatively small gap allows for a continuous flow of the air past the first sealing element 40 to maintain a continuous flow of the air to the passenger compartment of the motor vehicle. The fluid distribution door 20 in the bleed position causes the flow of the air to encounter a rapidly decreasing cross-sectional flow area as the flow of the air approaches the tip 46 of the first sealing element 40. The reduction in the flow area causes the flow of the air to increase in speed as the air passes adjacent the first sealing element 40 and past the tip 46, causing a potential incidence of whistling if the flow of the air is not properly controlled as it passes by the tip 46.

When in the bleed position, each of the dentil features 80 formed on the first surface 47 of the stem 44 is spaced from the main housing 14 and positioned to encounter the flow of the air through the mixing section 8. The air flowing through the gap includes at least a first portion flowing through flow channels formed between adjacent ones of the spaced apart dentil features 80 formed on the first surface 47, at least a second portion encountering the inboard faces 82 of the dentil features 80 formed on the first surface 47, and at least a third portion flowing between the outermost faces 85 of the dentil features 80 formed on the first surface 47 and the main housing 14. The second portion of the flow of the air is deflected by each of the inboard faces 82 to cause the flow of the air to flow past at least one of the outermost face 85, the first side face 86, and the second side face 88 of each of the dentil features 80. The second portion of the air deflected by each of the inboard faces 82 is accordingly deflected towards the first portion of the flow of the air passing between the dentil features 80 and the third portion of the flow of the air passing over each of the dentil features 80. As such, each of the portions of the flow of the air encounters at least one other portion of the flow of the air due to the deflection caused by the dentil features 80. Additionally, the presence of the dentil features 80 causes the flow of the air to experience variable pressures adjacent the dentil features 80 due to the altered flow path distances, further causing the deflection of the flow of air when attempting to equalize a pressure thereof. The deflected portions of the flow of the air thereby form a plurality of localized turbulence zones that ensure that the entirety of the flow of the air is interrupted along each portion of the fluid distribution door 20 having one of the linearly extending arrays of the dentil features 80. The turbulence in turn reduces the incidence of whistling as the air passes by the tip 46 of the first sealing element 40.

The flow of the air adjacent the array of the dentil features 80 then passes by the tip 46 of the first sealing element 40 to enter the fluid conduit 18 for distribution to the vents of the passenger compartment of the motor vehicle. The bead 49 formed at the tip 46 is configured to further add turbulence to any portions of the flow of the air encountering the bead 49 in addition to the turbulence caused by the array of the dentil features 80. However, the first sealing element 40 may alternatively be formed in the absence of the bead 49 so long as the array of the dentil features 80 is suitable for adding turbulence to the flow of the air for minimizing the incidence of whistling past the tip 46. However, each of the dentil features 80 must remain spaced apart from the tip 46 of the first sealing element 40 in the absence of the bead 49 to ensure that the dentil features 80 do not undesirably engage the main housing 14 when rotated to the bleed position.

FIG. 9 shows the fluid distribution door 20 when rotated to a closed position for blocking off the flow of air from entering the fluid conduit 18 of the main housing 14. The closed position includes the tip 46 of the first sealing element 40 engaging the sealing surface 15 of the main housing 14 to block all flow past the tip 46. Although not pictured, the sealing surface 15 of the main housing 14 is formed to correspond to the first perimeter 30 to ensure sealing about the entirety of the first perimeter 30 when in the closed position. The portion of the main housing 14 adjacent the sealing surface 15 thereof may be sloped or otherwise configured to be spaced from the first sealing element 40 to ensure that each of the dentil features 80 is spaced apart from the main housing 14 about the first perimeter 30 whenever the fluid distribution door 20 is positioned in the closed position. As such, the dentil features 80 are configured to never engage the main housing 14 regardless of a positioning of the fluid distribution door 20.

FIG. 10 illustrates the fluid distribution door 20 when placed in a secondary bleed position including the first sealing element 40 brought adjacent a secondary sealing surface 19 of the main housing 14 spaced apart from the sealing surface 15 shown in FIGS. 8 and 9. The secondary bleed position includes the second surface 48 of the stem 44 in facing relationship with the secondary sealing surface 19 following a counter-cloakwise rotation of the fluid distribution door 20, in contrast to the configurations shown in FIGS. 8 and 9 which include the first surface 47 in facing relationship with the sealing surface 15. The first sealing element 40 is accordingly suitable for reducing the incidence of whistling in the flow of air past the first sealing element 40 when the air passes by each opposing surface 47, 48 of the stem 44. The array of the dentil features 80 disposed on the second side 48 of the stem 44 operate in the same manner as those shown and described with reference to FIG. 8, wherein turbulence is induced in the flow of the air flowing past the array of the dentil features 80.

The fluid distribution door 20 including the array of the dentil features 80 provides numerous benefits over the noise reducing features of the prior art. The dentil features 80 are configured to always be spaced from the main housing 14 when the fluid distribution door 20 is rotated to any specified position due to the spacing of the dentil features 80 from the tip 46 of the first sealing element 40. This spacing ensures that the dentil features 80 do not interfer with the desired flow path of the air adjacent the fluid distribution door 20, in contrast to noise reducing features of the prior art that extend to the desired sealing surface to disadvantageously cause a continuous and uncontrolled flow of the air to flow past the noise reducing features. The inclusion of the dentil features 80 on a portion of the first sealing element 40 formed upstream of the bead 49 thereof allows for the bead 49 to act as a secondary noise reducing feature for further interrupting any air flows for which turbulence is not induced when passing by the array of the dentil features 80. The manner in which each of the dentil features 80 is formed as a pyramidal shaped projection allows for the first sealing element 40 to be easily manufactured in a molding operation, thereby reducing a cost and complexity of assembling the fluid distribution door 20.

While certain representative embodiments and details have been shown for purposes of illustrating the invention, it will be apparent to those skilled in the art that various changes may be made without departing from the scope of the disclosure, which is further described in the following appended claims.

What is claimed is:

1. A fluid distribution door for an air handling system of a heating, ventilating, and air conditioning system, the fluid distribution door comprising:
    a door wall having a perimeter;
    a sealing element disposed about the perimeter of the door wall, the sealing element including a base, a stem, and a tip, the base coupled to the perimeter of the door wall and the stem formed between the base and the tip, wherein a plurality of dentil features project from the stem of the sealing element, wherein the stem defines a longitudinal plane, and wherein each of the dentil features projects further away from the longitudinal plane than does the base with respect to a direction perpendicular to the longitudinal plane.

2. The fluid distribution door of claim 1, wherein the plurality of the dentil features is arranged in a linearly extending array.

3. The fluid distribution door of claim 2, wherein the array extends in a direction parallel to the perimeter of the door wall.

4. The fluid distribution door of claim 2, wherein each of the plurality of the dentil features is spaced from an adjacent one of the plurality of the dentil features in a direction parallel to the perimeter of the door wall.

5. The fluid distribution door of claim 2, wherein each of the plurality of the dentil features is spaced equidistantly from an adjacent one of the plurality of the dentil features.

6. The fluid distribution door of claim 1, wherein each of the plurality of the dentil features is spaced from each of the base and the tip of the sealing element.

7. The fluid distribution door of claim 1, wherein a bead is formed at the tip of the sealing element, and wherein the base and the bead include a thickness greater than a thickness of the stem.

8. The fluid distribution door of claim 1, wherein each of the plurality of the dentil features includes an inboard face in facing relationship with the base of the sealing element and an outboard face in facing relationship with the tip of the sealing element.

9. The fluid distribution door of claim 8, wherein each of the plurality of the dentil features further includes a first side face and an opposing second side face, the first side face and the second side face connecting the inboard face to the outboard face.

10. The fluid distribution door of claim 9, wherein the inboard face, the outboard face, the first side face, and the second side face cooperate to form a pyramid shape.

11. The fluid distribution door of claim 10, wherein the pyramid shape is truncated.

12. The fluid distribution door of claim 10, wherein the pyramid shape is an oblique pyramid shape.

13. The fluid distribution door of claim 9, wherein at least one of the inboard face, the outboard face, the first side face, and the second side face has a different angle of inclination relative to the stem of the sealing element in comparison to at least one of the others of the inboard face, the outboard face, the first side face, and the second side face.

14. The fluid distribution door of claim 1, wherein the sealing element is formed from a thermoplastic.

15. The fluid distribution door of claim 1, wherein the plurality of the dentil features project from each of a first surface of the stem and an opposing second surface of the stem.

16. An air handling system for a heating, ventilating, and air conditioning system comprising:
    a housing including a sealing surface;
    a door wall having a perimeter, the door wall disposed within the housing; and
    a sealing element disposed about the perimeter of the door wall, the sealing element including a base, a stem, and a tip, the base coupled to the perimeter of the door wall, the stem formed between the base and the tip, and the tip configured to selectively engage the sealing surface of the housing, wherein a plurality of dentil features projects from the stem of the sealing element, wherein the stem defines a longitudinal plane, and wherein each of the dentil features projects further away from the longitudinal plane than does the base with respect to a direction perpendicular to the longitudinal plane.

17. The air handling system of claim 16, wherein the plurality of the dentil features is spaced from the housing when the tip engages the sealing surface of the housing.

18. The air handling system of claim 16, wherein the plurality of the dentil features is arranged in a linearly extending array extending in a direction parallel to the perimeter of the door wall.

19. The air handling system of claim 16, wherein each of the plurality of the dentil features is provided in a pyramid shape and includes an inboard face in facing relationship with the base of the sealing element, an outboard face in facing relationship with the tip of the sealing element, a first side face, and an opposing second side face, the first side face and the second side face connecting the inboard face to the outboard face.

20. The air handling system of claim 19, wherein the pyramid shape is an oblique pyramid shape.

\* \* \* \* \*